US008929243B2

(12) United States Patent
Kurata et al.

(10) Patent No.: US 8,929,243 B2
(45) Date of Patent: Jan. 6, 2015

(54) NETWORK MONITORING DEVICE

(71) Applicant: Hitachi, Ltd., Tokyo (JP)

(72) Inventors: Ryosuke Kurata, Tokyo (JP); Shuhei Takahashi, Kanagawa (JP); Hideaki Ishii, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 142 days.

(21) Appl. No.: 13/774,235

(22) Filed: Feb. 22, 2013

(65) Prior Publication Data

US 2013/0322272 A1      Dec. 5, 2013

(30) Foreign Application Priority Data

Jun. 5, 2012  (JP) ................................. 2012-127667

(51) Int. Cl.
*H04L 12/28* (2006.01)
*H04W 24/08* (2009.01)
*H04L 12/26* (2006.01)
*H04L 29/08* (2006.01)
*H04W 52/02* (2009.01)

(52) U.S. Cl.
CPC .............. *H04W 24/08* (2013.01); *H04L 43/16* (2013.01); *H04L 29/08099* (2013.01); *H04W 52/0232* (2013.01); *H04L 67/025* (2013.01); *H04L 12/2825* (2013.01); *H04L 12/2823* (2013.01); *H04L 12/2809* (2013.01)
USPC ......................................... 370/252; 709/224

(58) Field of Classification Search
None
See application file for complete search history.

(56) References Cited

U.S. PATENT DOCUMENTS

| 7,505,795 | B1 * | 3/2009 | Lim et al. ....................... 455/574 |
| 7,532,577 | B2 * | 5/2009 | Park et al. ...................... 370/241 |
| 7,835,739 | B2 * | 11/2010 | Del Signore et al. ...... 455/435.1 |
| 8,060,054 | B1 * | 11/2011 | Dinan et al. ............... 455/343.4 |
| 8,271,666 | B2 * | 9/2012 | Narayana et al. ............. 709/228 |
| 8,340,631 | B2 * | 12/2012 | Mann et al. ................... 455/405 |
| 8,611,268 | B1 * | 12/2013 | Thandaveswaran .......... 370/311 |
| 8,634,328 | B2 * | 1/2014 | Mishra et al. ................. 370/254 |
| 8,681,711 | B2 * | 3/2014 | Balasubramanian ......... 370/329 |
| 8,752,169 | B2 * | 6/2014 | Long et al. ...................... 726/22 |
| 8,761,041 | B2 * | 6/2014 | Tamaki ......................... 370/253 |
| 2002/0094831 | A1 * | 7/2002 | Maggenti et al. ............. 455/518 |
| 2002/0152432 | A1 * | 10/2002 | Fleming ......................... 714/47 |
| 2005/0018617 | A1 * | 1/2005 | Jin et al. ........................ 370/252 |
| 2005/0135248 | A1 * | 6/2005 | Ahuja et al. .................. 370/235 |
| 2006/0067228 | A1 * | 3/2006 | Ronciak et al. ............... 370/235 |

(Continued)

FOREIGN PATENT DOCUMENTS

| JP | 09-098167 A | 4/1997 |
| JP | 2002-024976 A | 1/2002 |

*Primary Examiner* — Jae Y Lee
*Assistant Examiner* — Andrew Oh
(74) *Attorney, Agent, or Firm* — Foley & Lardner LLP

(57) ABSTRACT

A zero traffic state that is a non-communication state derived from any fault is discriminated from a no-operation state derived from, power discontinuity, and a communication device that is in the zero traffic state is efficiently sensed in consideration of a zero traffic period that is normally observed in a certain installation place or use environment. A network monitoring device cyclically notifies a maintenance person of a communication device, for which a time difference between a final access time and a finally passed traffic generation time exceeds a threshold calculated by multiplying a previously observed maximum, value of the time difference between the final access time and the finally passed traffic generation time by a coefficient that is a safety factory as a device that is In a zero traffic suspected state.

4 Claims, 11 Drawing Sheets

(56) References Cited

U.S. PATENT DOCUMENTS

| | | | |
|---|---|---|---|
| 2006/0250954 A1* | 11/2006 | Mulrane et al. | 370/229 |
| 2007/0121497 A1* | 5/2007 | Gibson Ang et al. | 370/229 |
| 2008/0082180 A1* | 4/2008 | Blevins et al. | 700/29 |
| 2008/0095165 A1* | 4/2008 | Johnson et al. | 370/392 |
| 2008/0294745 A1* | 11/2008 | Lowery et al. | 709/214 |
| 2009/0238116 A1* | 9/2009 | Chaponniere et al. | 370/328 |
| 2009/0249481 A1* | 10/2009 | Long et al. | 726/22 |
| 2010/0008250 A1* | 1/2010 | Nomura et al. | 370/252 |
| 2010/0235688 A1* | 9/2010 | Bennah et al. | 714/57 |
| 2011/0228761 A1* | 9/2011 | Miyata et al. | 370/352 |
| 2011/0300888 A1* | 12/2011 | Sakumoto | 455/509 |
| 2011/0320617 A1* | 12/2011 | Annamalaisami et al. | 709/228 |
| 2012/0099501 A1* | 4/2012 | Babin | 370/311 |
| 2013/0057405 A1* | 3/2013 | Seelman et al. | 340/545.2 |
| 2014/0031027 A1* | 1/2014 | Dalsgaard | 455/418 |
| 2014/0040383 A1* | 2/2014 | Dura et al. | 709/206 |

* cited by examiner

| | FINAL ACCESS TIME | FINALLY PASSED TRAFFIC GENERATION TIME | WHETHER ZERO TRAFFIC ALARM IS GIVEN | DEVICE REGISTRATION DATE |
|---|---|---|---|---|
| DEVICE 1 | 09/02/2011 00:00 | 09/02/2011 00:20 | NOT GIVEN | 08/01/2011 10:00 |
| DEVICE 2 | 09/02/2011 00:15 | 09/01/2011 23:48 | NOT GIVEN | 08/01/2011 10:00 |
| DEVICE 3 | 09/02/2011 00:30 | 08/10/2011 00:23 | BEING GIVEN | 08/01/2011 10:00 |
| DEVICE 4 | 09/01/2011 15:15 | 08/31/2011 15:15 | NOT GIVEN | 08/31/2011 11:00 |
| DEVICE 5 | 09/01/2011 23:43 | 09/01/2011 23:43 | NOT GIVEN | 08/31/2011 11:00 |
| DEVICE 6 | 08/31/2011 16:14 | 08/31/2011 16:14 | NOT GIVEN | 08/31/2011 11:00 |
| | | | | |

| | ZERO TRAFFIC OCCURRENCE THRESHOLD | ZERO TRAFFIC PERIOD | ZERO TRAFFIC PERIOD (PEAK VALUE) | [h] |
|---|---|---|---|---|
| DEVICE 1 | 13.95 | 0.6 | 1.5 | |
| DEVICE 2 | 22.92 | 23.0 | 23.0 | |
| DEVICE 3 | 16.16 | 3.0 | 3.2 | |
| DEVICE 4 | 32.54 | 15.8 | 15.8 | |
| DEVICE 5 | 103.13 | 54.7 | 70.1 | |
| DEVICE 6 | 33.19 | 12.0 | 16.3 | |
| | | | | |

201 — ZERO TRAFFIC OCCURRENCE THRESHOLD
202 — ZERO TRAFFIC PERIOD
203 — ZERO TRAFFIC PERIOD (PEAK VALUE)

| | | |
|---|---|---|
| 251 | ZERO TRAFFIC RECOVERY THRESHOLD | 6 h |
| 252 | MINIMUM THRESHOLD | 6 h |
| 253 | COEFFICIENT | 1.3 |
| 254 | NOTIFICATION CYCLE | 1 h |
| 255 | DECISION CYCLE | 3 h |

| | | |
|---|---|---|
| 301 | TRAFFIC PASSAGE FLAG (UPLINK) | PRESENT |
| 302 | TRAFFIC PASSAGE FLAG (DOWNLINK) | PRESENT |
| 303 | FINALLY PASSED TRAFFIC GENERATION TIME | 04/01/2013 13:00 |

| | ZERO TRAFFIC OCCURRENCE THRESHOLD 201 | ZERO TRAFFIC PERIOD 202 | ZERO TRAFFIC PERIOD (PEAK VALUE) #1 203-1 | ZERO TRAFFIC PERIOD (PEAK VALUE) #2 203-2 | ... | ZERO TRAFFIC PERIOD (PEAK VALUE) #n 203-n [h] |
|---|---|---|---|---|---|---|
| DEVICE 1 | 13.95 | 0.6 | 1.5 | 3.0 | ... | 5.0 |
| DEVICE 2 | 22.92 | 23.0 | 23.0 | 18.0 | ... | 31.0 |
| DEVICE 3 | 16.16 | 3.0 | 3.2 | 5.0 | ... | 4.7 |
| DEVICE 4 | 32.54 | 15.8 | 15.8 | 19.0 | ... | 21.8 |
| DEVICE 5 | 103.13 | 54.7 | 70.1 | 55.6 | ... | 62.0 |
| DEVICE 6 | 33.19 | 12.0 | 16.3 | 10.6 | ... | 18.0 |
| | | | | | | |

NETWORK MONITORING DEVICE

CLAIM OF PRIORITY

The present application claims priority from Japanese patent application serial no. 2012-127667, filed on Jun. 5, 2012, the content of which is hereby incorporated by reference into this application.

BACKGROUND OF THE INVENTION

1. Field of the Invention

The present invention relates to a network monitoring device that monitors communication devices, or more particularly, to a network monitoring device for a system that accommodates many objects of management which have relatively low reliability compared with switching equipment, transmission equipment, or backbone communication equipment and which Include customer premises equipment (CPE), a femtocell base station, a Home Energy Management System (HEMS), a Worldwide Interoperability for Microwave Access (WiMAX) Wireless Fidelity (WiFi) router, and an onboard wireless repeater.

2. Description of the Related Art

In recent years, communication carriers have come to extensively introduce such facilities as a WiFi spot, a femtocell base station, and a WiFi mobile router to cope with a drastic increase in traffic due to prevalence of smartphones and mobile data communications. Data traffic in vehicles such as railroad trains is increasing, and building a WiFi access point is being encouraged as an off-road commitment to third-generation (3G) networks.

Further, optical access services have prevailed, and termination devices for optical access lines have come to exhibit high performance and cope with services of high value. Further, planning of providing electricity meters or the like with a capability of communication equipment and using the electricity meters as an infrastructure to support new services including a smart grid is in progress.

Specifically, the importance of relatively low-reliability and small-sized communications infrastructures such as the CPE, femtocell base station, HEMS, WiMAX router, WiFi router, and wireless repeater is thought to more and more grow.

The above low-reliability and small-sized communication devices have features that are described below and are different from those of high-reliability, large-scale, and high-availability communications infrastructures such as existing transmission equipment and switching equipment.

(1) Although each of the devices has a small size and a small capacity, the number of communication devices constituting a system is very large (it may reach several tens of thousands or several millions).

(2) Ceasing use of any of the devices for reasons only known to a device user or device installing person takes place daily. A network administrator cannot grasp or administer usages of all the devices.

In order to attract end users, communications carriers are laying weight on improvement of service quality, or more especially, improvement of communication quality. Noted is that the CPE refers to a premises device and encompasses a home gateway (HGW) and optical network unit (ONU).

Patent documents cited during prior-art search are JP-A-2002-024976 and JP-A-09-098167. JP-A-2002-024976 discloses an abnormality monitoring and reporting system in paragraphs 0019 and 0021 to 0025 and FIG. 1. Herein, the system includes central equipment and plural reporting terminals. Initial report data is transmitted from each of the reporting terminals to the central equipment. When any of the reporting terminals is designated as a terminal that is an object of no-communication state monitoring, an average report receiving interval and maximum report receiving Interval are calculated based on a reporting interval for previous report data in relation to each of the reporting terminals, preserved, and designated as a reference report receiving interval (comparable to a threshold). If a no-reporting time exceeds the reference report receiving interval, wireless reporting and monitoring information that includes device information with which the reporting terminal is identified is outputted in order to notify a monitoring person.

SUMMARY OF THE INVENTION

In a system accommodating existing high-quality and high-availability switching equipment, transmission equipment, and others, each piece of equipment acquires statistical data of a communication history, a network monitoring device stores the data, and a maintenance person references the statistical data so as to monitor the quality of a network on a medium- or long-term basis. Thus, efforts have been made to sustain network quality.

However, as far as low-reliability and small-sized communication devices are concerned, since the number of communication devices concerned is very large, it is quantitatively difficult to regularly acquire statistical information from each of the communication devices, monitor traffic states of the respective communication devices, and verify communication quality.

As a method for implementing quality control of communication devices, provision of a threshold alarm feature that designates a threshold for statistics of statistical data items, and gives an alarm if the statistic exceeds the threshold condition is conceivable. In this case, a maintenance person may not read out the states of all the communication devices but can maintain the communication device, the statistic of which exceeds the designated threshold condition, in response to an autonomous message transmitted from the device.

However, even the threshold alarm cannot be said to be feasible. This is because when the threshold alarm is implemented in each of a large number of devices including CPE and a public communication spot device, an event that so many alarms may be given under a certain condition that a maintenance person cannot fully investigate the states of all the devices is predicted.

Even when a statistical data acquisition feature is provided, as far as a device such as CPE whose power supply may be turned off for reasons only known to an end user is concerned, a case where statistical data cannot be acquired occurs frequently as a sub-normal case. Therefore, it is difficult to conduct trend analysis under a precondition that cyclical statistics should be available, or suspend giving of a threshold alarm for protection.

Further, as a method for verifying the quality of a network on which communication devices are connected, a method in which a network test is conducted is conceivable. However, CPE or a device at a wireless LAN access point or spot that is requested to be small-sized and low-cost cannot internally include a wireless device for test which is used to simulate a user terminal. Therefore, the CPE or device cannot be provided with a testing feature that actually verifies whether the user terminal is in an actually connectable state.

In other words, unless it is verified that an end user is actually connected onto a network, the fact that the end user is in the connectable state cannot be confirmed. It is quantitatively difficult to check the end users of all communication devices accommodated by a system to see whether they are in the connectable state.

A wireless LAN access point or spot is often built in an office building, underground mall, shop, railroad vehicle, or the like. In this case, traffic is predictably hardly passed on non-business days. Therefore, it is difficult to suspect a fault on the basis of the fact that the number of user connections is null.

The present invention provides a network monitoring device that discriminates power discontinuity and readily senses a communication device that is in a zero-traffic state.

The communication device includes a unit that records a time at which traffic which has been passed between a downstream end user and an upstream, upper-level node is generated.

The communication device includes a unit that cyclically notifies the network monitoring device of a finally passed traffic generation time. A method in which the communication device does not include the unit but the network monitoring device cyclically queries the communication device about the time so as to acquire the time may be adopted.

The network monitoring device preserves the finally passed traffic generation time in association with each communication device. In general, between the network monitoring device and a communication device that is an object of monitoring, any of various communications protocols including the simple network management protocol (snmp), Transaction Language 1 (TL1), and Simple Object Access Protocol (SOAP) is used to perform various control communications such as regular transfer of a life-or-death monitoring message, transmission of a designation request to be carried by a maintenance command or a response to the request, or transmission of a notification from the communication device to the network monitoring device to be performed in the case of occurrence of a fault or state transition.

The history of the communications is managed for each communication device, and a time at which the network monitoring device receives a final response to a control communication or a final notification from the communication device is recorded as a final access time in the network monitoring device.

The network monitoring device cyclically activates processing of verifying whether a zero traffic has occurred. Specifically, for a communication device for which a time difference between the final access time and finally passed traffic generation time, that is, a zero traffic period exceeds a certain threshold, a period during which the communication device has started and is communicating with an upper-level side but does not communicate traffic to an end user is recognized to continue. A maintenance person is therefore notified of a zero traffic alarm.

As a zero traffic occurrence threshold that is a condition under which a maintenance person is notified of a zero traffic alarm, a value obtained by multiplying a maximum value of a zero traffic period, which is previously observed in the communication device concerned, by a coefficient is used.

In other words, the network monitoring device manages the maximum value of the zero traffic period in association with each device, and notifies a maintenance person of a device whose zero traffic state has continued for a period longer than a period obtained by multiplying the maximum value by a coefficient that is a safety factor.

Thereafter, when traffic is generated in the communication device concerned, if the zero traffic period falls below a recovery condition value, the network monitoring device restores the zero traffic alarm. At the same time, the network monitoring device uses a maximum value of the zero traffic period, which is updated during an alarm giving period, to reexecute multiplication of the maximum, value of the zero traffic period, which is previously observed in the communication device, by the coefficient, and adopts the value as the zero traffic occurrence threshold next time and thereafter.

Information on the zero traffic period which is previously observed and from which a communication device is recovered is recursively used as a new threshold condition. This makes it possible for a system to gradually learn a difference in a condition such as a use situation, a day off period, a public holiday period, or a maintenance halt period for a railroad vehicle which differs from a communication device so a communication device, and efficiently discover a device, which is in a zero traffic state, while suppressing transmission of an unnecessary fault occurrence notification.

The aforesaid object can be accomplished by a network monitoring device connected to communication devices over a network and including a recording unit in which a time at which a response is finally received from or access is finally gained by the communication device is recorded as a first time, a receiving unit that regularly receives, from the communication device, and records a second time that is a finally passed traffic generation time, and an arithmetic unit that subtracts the second time from the first time, compares a result of the subtraction with a first threshold for the communication device, and gives an alarm when the result of the subtraction exceeds the first threshold.

According to the present invention, there is provided a network monitoring device that discriminates power discontinuity of a communication device, and readily senses the communication device that; is in a zero traffic state.

BRIEF DESCRIPTION OF THE DRAWINGS

FIG. 6A is a zero traffic history management table of the network monitoring device;

FIG. 6B is a parameter table of the network monitoring device;

FIG. 7 is a traffic management table of the communication device;

FIG. 14 is another zero traffic history table for the network monitoring device;

DESCRIPTION OF THE PREFERRED EMBODIMENTS

Figure 1:
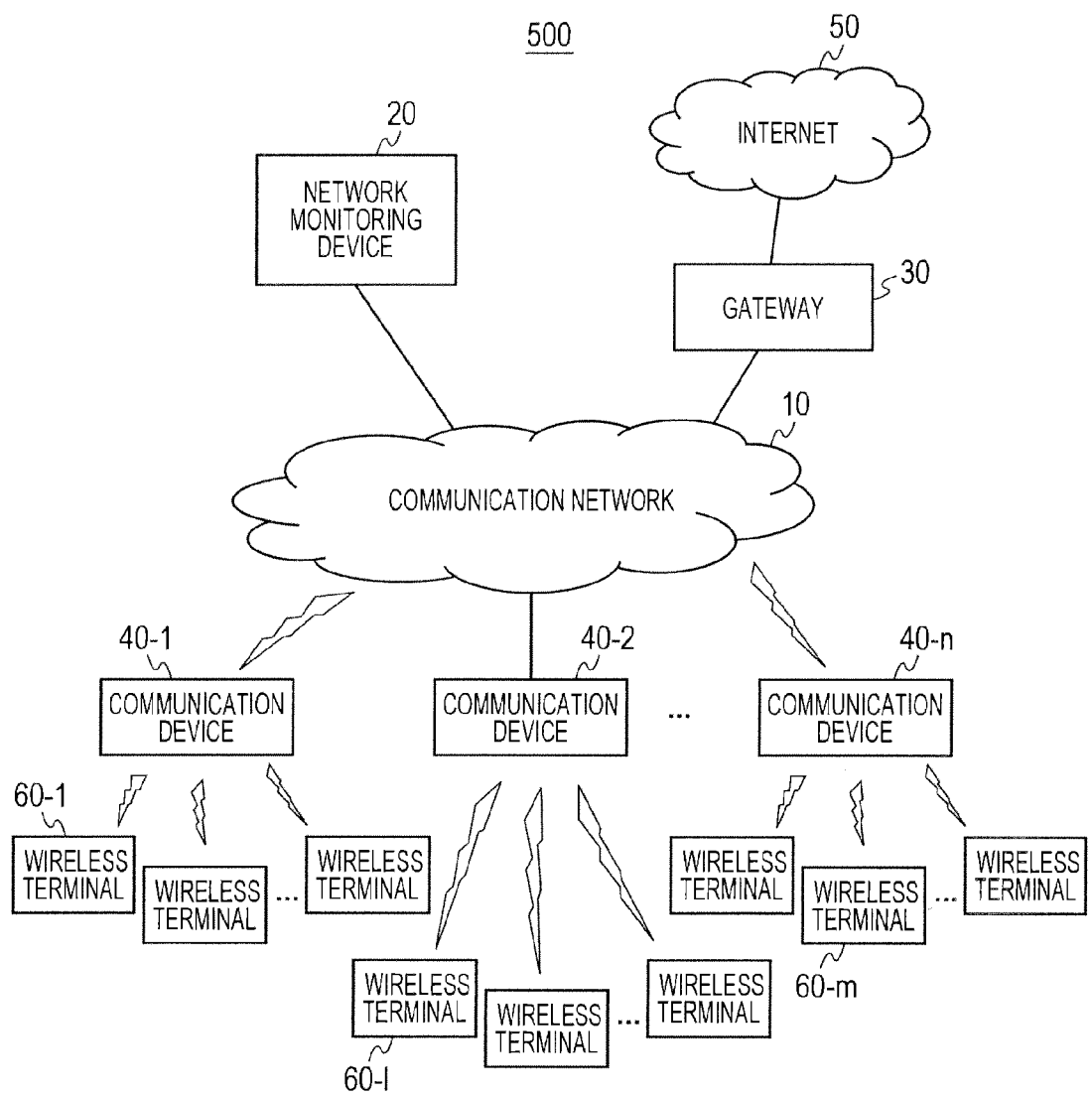
FIG. 1 is a block diagram for explaining the configuration of a communication system.

Referring to the drawings, embodiments of the present invention will be described below. The same reference numerals will be assigned to substantially identical regions, and an iterative description will be omitted.

First Embodiment

Referring to FIG. 1, the configuration of a communication system, will be described. In FIG. 1, a communication system 500 includes a communication network 10, a network monitoring device 20, a gateway 30, communication devices 40, the Internet 50, and wireless terminals 60. The network monitoring device 20 is connected onto the communication network 10 by cable. The communication devices 40 are connected onto the communication network 10 by radio or by cable. The network monitoring device 20 remotely monitors the communication devices 40 over the communication network 10. The communication network 10 is connected with the Internet 50 via the gateway 30. The wireless terminals 60 are connected to the communication devices 40 through radio communication. The wireless terminals 60 receive services from the Internet 50 via the communication devices 40 and gateway 30.

Noted is that the communication devices and wireless terminals in this specification encompass quite wide-ranging concepts. More particularly, if the communication devices are electricity meters included in a smart grid, the wireless terminals are home electric appliances each having a communication feature.

Figure 2:
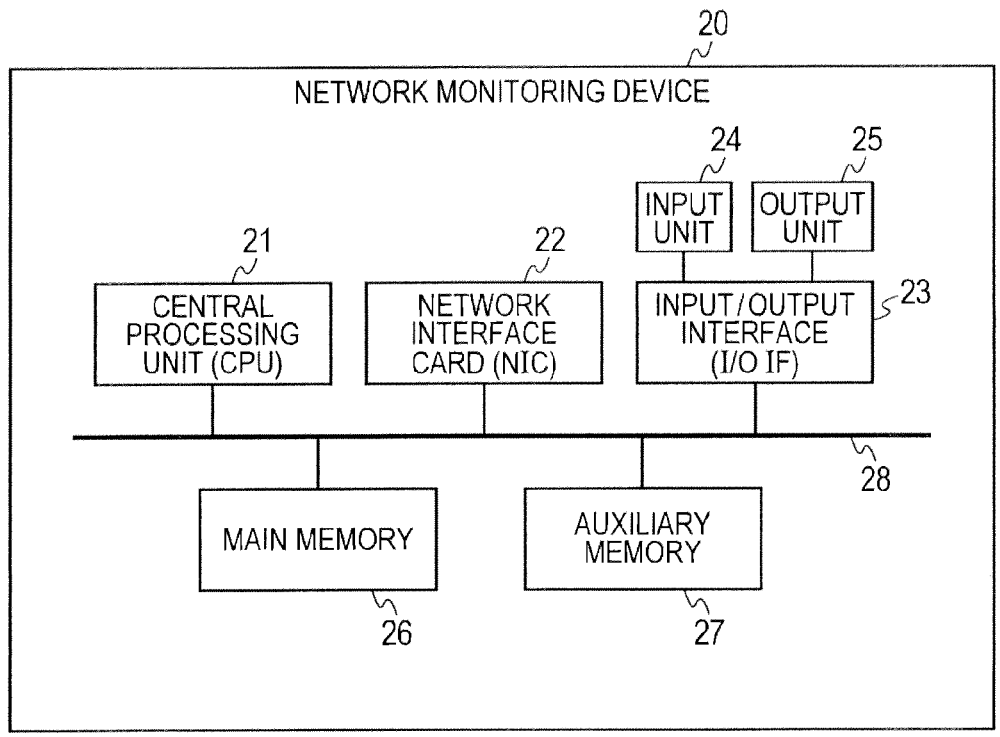
FIG. 2 is a hardware block diagram of a network monitoring device.

Referring to FIG. 2, the hardware of the network monitoring device will be described below. In FIG. 2, the network monitoring device 20 has the same hardware configuration as a typical information processing device such as a personal computer or workstation does. In FIG. 2, the network monitoring device 20 includes a central processing unit (CPU) 21, a main memory 26, a network interface card (NIC) 22, an input/output interface (I/O IF) 23, an auxiliary memory 27, and an input unit 24 and output unit 25 connected to the input/output interface 23 which are interconnected over an internal transmission line 28.

The central processing unit 21 loads any of functional blocks, which are stored in the auxiliary memory 27, onto the main memory 26, and executes a program that implements the loaded functional block. The network monitoring device 20 is connected onto the communication network It by coupling a FAN cable, which is not shown, to the network interface card 22. The input unit 24 receives data through wired connection, and the data is transmitted from the output unit 25 to a terminal screen of the network monitoring device 20 which is not shown.

Figure 3:
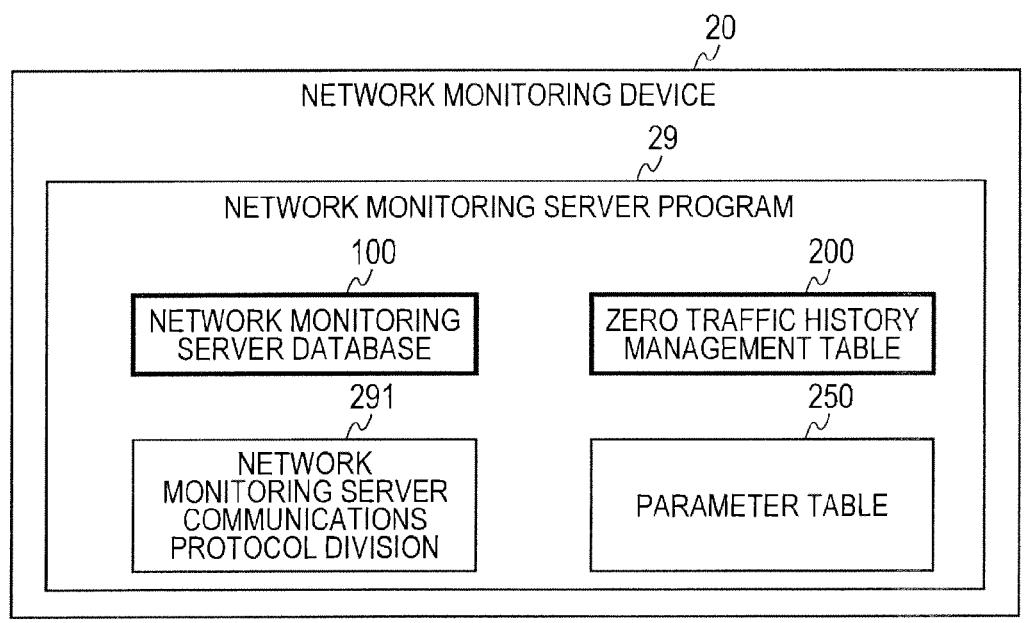
FIG. 3 is a functional block diagram of the network monitoring device.

Referring to FIG. 3, a server program to be run in the network monitoring device will be described below. In FIG. 3, a network monitoring server program 29 is run in the network monitoring device 20 in order to implement monitoring control of the communication devices 40. The network monitoring device 20 communicates with the communication devices via a network monitoring server communications protocol division 291. As a communications protocol to be installed, the snmp, TL1, SOAP, or hypertext transport protocol (http) is conceivable. The network monitoring server program 29 includes a network monitoring server database 100 so as to manage information on each of the communication devices 40 that are objects of monitoring. The network monitoring server program 29 manages a zero traffic history management table 200 so as to preserve data to be needed by a zero traffic detection feature. The network monitoring server program 29 further manages a parameter table 250 so as to preserve parameters.

Figures 4, 5:
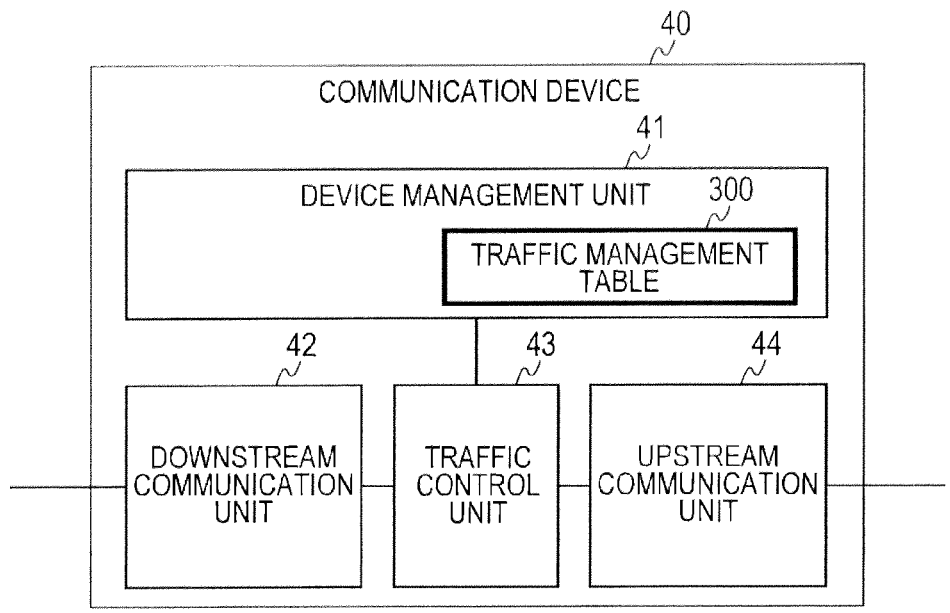
FIG. 4 is a functional block diagram, of a communication device.
FIG. 5 is a diagram for explaining a server database of the network monitoring device.

Referring to FIG. 4, the configuration of the communication device will be described below. In FIG. 4, the communication device 40 includes a device management unit 41, a downstream communication unit 42, a traffic control unit 43, and an upstream communication unit 44. The device management unit 41 preserves a traffic management table 300.

The device management unit 41 monitors and controls the communication device itself, and an agent program that responds a control instruction or data reference request transmitted from the network management device 20 is run in the device management unit 41. The traffic management table 300 is a table which the traffic control unit 43 and device management unit 41 use to acquire and manage data concerning a situation of traffic.

The downstream communication unit 42 is an interface via which communication services are provided for an end user. As the downstream communication unit 42, various types of interfaces for connection onto the wireless LAN, wired LAN, 3G mobile communications network, and LTE network are conceivable . The traffic control unit 43 has the capability to transfer a packet, which is passed to the communication device 40, to an appropriate transmission destination. The traffic control unit 43 provides various kinds of data items that are needed by a zero traffic detection feature. The upstream communication unit 44 is an interface for connection onto a network that accommodates the communication device 40. As the upstream, communication unit 44, various types of interfaces for connection onto the wired LAN, WiMAX network, 3G network, and LTE network are conceivable.

Referring to FIG. 5, the network monitoring server database of the network monitoring device will be described below. In FIG. 5, in the network monitoring server database 100, a final access time 101, a finally passed traffic generation time 102, whether a zero traffic alarm is given 103, and a device registration date 104 are managed In association with each of communication devices that are objects of monitoring.

The final access time 101 Is a field in which a time at which the communications protocol division 291 of the network monitoring device receives a notification from the communication device 40 or a time at which the communication device 40 responds to a request is recorded.

The finally passed traffic generation time 102 is a field in which a finally passed traffic generation time notified by the communication device 40 is stored. Calculation of the finally passed traffic generation time by the communication device 40 and notification of the finally passed traffic generation time from the communication device 40 to the network monitoring device 20 will be described later in conjunction with FIGS. 8 and 10 respectively.

Whether a zero traffic alarm is given 103 is a field in which whether a zero traffic alarm of which a maintenance person is notified is given is preserved in association with each of communication devices. Processing of deciding whether a zero traffic alarm is given will be described later in conjunction with FIG. 11.

The device registration date 104 is a field in which a date and time on and at which the communication device 40 is registered in the network monitoring device 20 to become an object of monitoring is preserved.

Referring to FIG. 6A, the zero traffic history management table of the network monitoring server will be described below. In FIG. 6A, the zero traffic history management table 200 includes a zero traffic occurrence threshold 201, a zero traffic period 202, and a zero traffic period (peak value) 203 in association with each of communication devices.

The zero traffic occurrence threshold 201 is a field in which a value of a threshold used to give an alarm if a zero traffic state continues for a period equal to or larger than the value is stored. A trigger for updating the value of the zero traffic occurrence threshold will be described later in relation to threshold updating processing in FIG. 11 (S409), and a calculation method will be described later in conjunction with FIG. 13.

The zero traffic period 202 is a field in which a value of a zero traffic period which the network monitoring device recognizes as being observed in the communication device concerned is stored. The zero traffic period 202 specifies a value that is calculated at step 403 of zero traffic detection processing which the network monitoring server cyclically performs.

$$\text{Zero traffic period 202} = \text{final access time 101} - \text{finally passed traffic generation time 102} \quad (1)$$

The zero traffic period 202 is calculated according to the formula (1). Calculation processing will be detailed later in conjunction with FIG. 11.

The zero traffic period (peak value) 203 is a field in which a peak value (maximum value) of the zero traffic period that is previously observed in the device concerned is stored. The zero traffic period (peak value) 203 specifies a value that is updated through peak value updating processing mentioned in FIG. 11 (S410). The peak value updating processing (S410) will be detailed laser in conjunction wish FIG. 12.

The values in the network monitoring server database 100 in FIG. 5 and the values in the zero traffic history management table 200 in FIG. 6A are not the values detected at the same time.

Referring to FIG. 6B, the parameter table will be described be low. In FIG. 6B, the network monitoring device 20 preserves parameters, which do not depend on any communication device 40, for managing zero traffic states. A zero traffic recovery threshold 251 specifies a threshold to be used to restore a zero traffic alarm. Namely, the zero traffic alarm is restored in case the zero traffic period falls below she threshold. A minimum threshold 252 specifies a parameter for determining a minimum value for the zero traffic occurrence threshold. A coefficient 206 specifies a safety factor to be used to prevent erroneous detection at the time of calculating the zero traffic occurrence threshold. The usage of the coefficient 206 will be described later in conjunction with FIG. 13.

A notification cycle 254 specifies a cycle in which the network monitoring device 20 is notified of a message including information on she finally passed traffic generation time 102 by the communication device 40. As for the notification cycle 254, a method in which the notification cycle 254 is set In the communication device 40 and the communication device 40 is asked to cyclically transmit the message as a notification, and a method in which the notification cycle 254 is set in the network monitoring device 20 and the network monitoring device 20 requests the communication device 40 to notify the finally passed traffic generation time at intervals of the cycle set as the parameter value are conceivable. A decision cycle 255 specifies a cycle at Interval of which the network monitoring device 20 activates zero traffic detection processing (S401).

Referring to FIG. 1, the traffic management table of the communication device will be described below. In FIG. 7, the traffic management table 300 preserves whether traffic is passed to the communication device 40 during a period from a certain previous time up to the present, and manages a history of notifications of whether the traffic is passed which are transmitted to the network monitoring device 20.

A traffic passage flag (uplink) 301 and traffic passage flag (downlink) 302 are cyclically cleared and reset to a state indicating that traffic is absent. If traffic is passed within a cycle, the uplink or downlink passage flag 301 or 302 is updated to indicate traffic Present.

The finally passed traffic generation time 303 is a field in which, when both the traffic passage flag (uplink) 301 and traffic passage flag (downlink) 302 indicate the presence of passed traffic at the end of a cycle, the time of the end of the cycle is stored. The finally passed traffic generation time 303 is transmitted while being contained in a cycle message to be posted to the network monitoring device 20. A full detail will be given in conjunction with FIG. 8.

Figure 8:
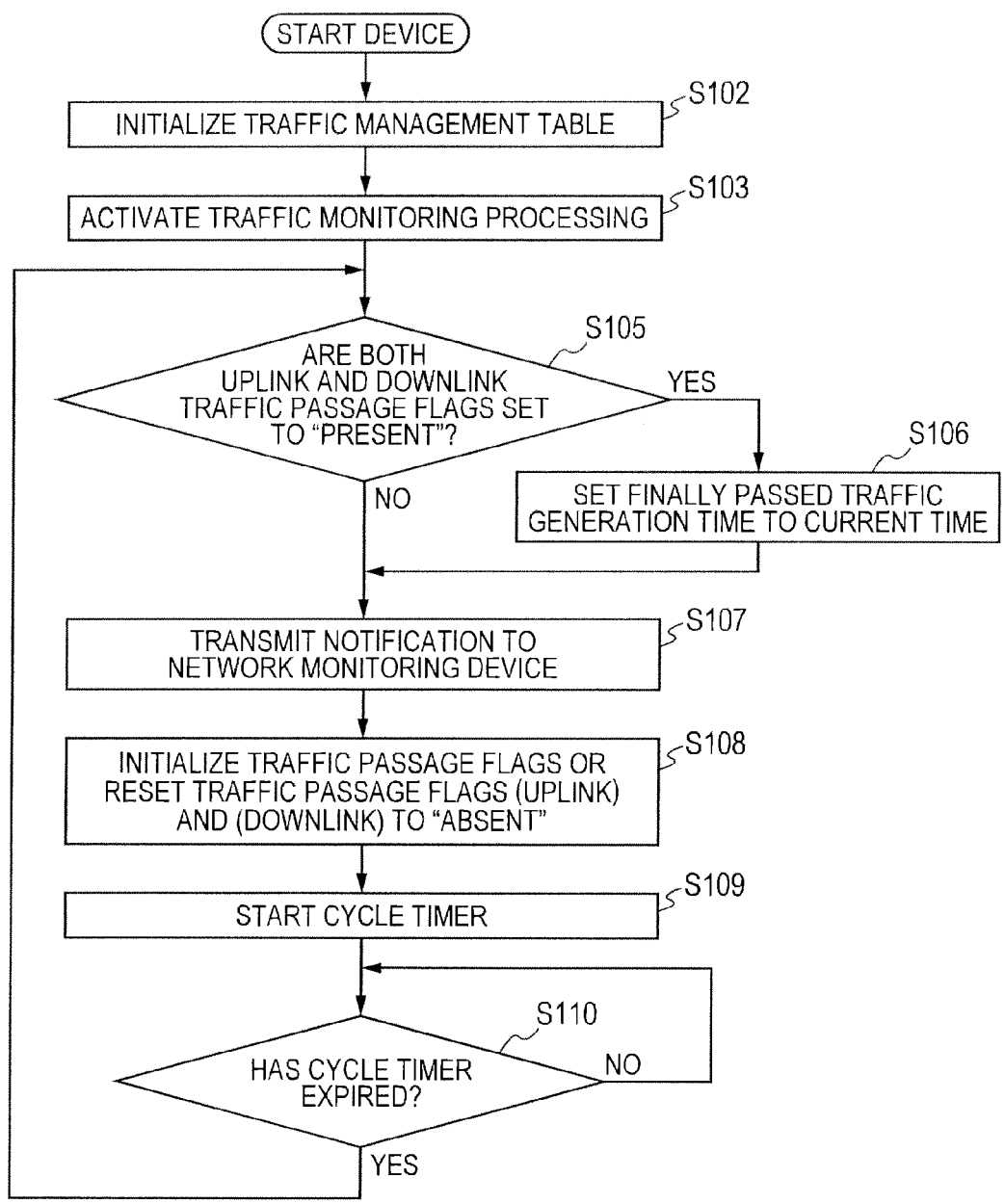
FIG. 8 is a flowchart describing cycle processing to be performed by the communication device.

Referring to FIG. 8, a cycle processing flow in the communication device well be described below. Herein, the notification cycle 254 in FIG. 6B is set in the communication device 40, and processing of notifying the finally passed traffic generation time is cyclically performed.

After the communication device 40 is started, the communication device 40 initializes the traffic management table 300 (S102). At this time, the communication device 40 initializes the traffic passage flag (uplink) 301 and traffic passage flag (downlink) 302 with Absent. The communication device 40 initializes the finally passed traffic generation time 303 with a current time at which the communication device is started. Although no traffic is passed, the finally passed traffic generation time is initialized with the current time. This is intended so that the communication device to which traffic is not at all passed after the communication device Is installed is not recognized as suffering from a silent fault, but a zero traffic alarm can be given after a predetermined threshold period has elapsed.

The communication device 40 activates traffic monitoring processing (S103). Specifically, the communication device 40 initiates monitoring of whether any of coming packets is passed to the communication device. The traffic monitoring processing will be detailed later in conjunction with FIG. 9. The communication device 40 decides whether both the traffic passage flag (uplink) 301 and traffic passage flag (downlink) 302 are set to Present (S105). If passed traffic is present on both the uplink and downlink (Yes), the communication device 40 updates the finally passed traffic generation time 103 with a current time (S106). The communication device 40 notifies the network monitoring device 20 of the finally passed traffic generation time (S107). If both the traffic passage flags (uplink) and (downlink) are found at step 105 not to be set to Present (No), the communication device 40 notifies the network monitoring device of the shored value of the finally passed traffic generation time 103 (S103). After the notification to the network monitoring device 20 is transmitted, the communication device 40 initializes the traffic passage flags 302 and 303 to Absent (S108). The communication device 40 starts a cycle timer (S109). The communication device 40 decides whether the cycle timer has expired (S110). If Yes, the communication device 40 proceeds to step 105.

The communication device 40 enters a wait state for expiration of the cycle timer. Nevertheless, the communication device 40 continues updating processing of the traffic management table 300 through traffic monitoring processing.

In the processing of step 103, a condition under which a decision is made that passed traffic is present is that passed traffic is present on both the uplink and downlink. This is because services oriented to end users are provided by communication devices, which are to be treated with the present embodiment, on the assumption that a protocol to be Implemented by communicating one-way traffic alone is not employed. More particularly, when an end user utilizes services conformable to the file transfer protocol (ftp) or Dynamic Host Configuration Protocol (DHCP), since the end user transfers ACK or a response to or from an upper-level system, two-way traffic is generated without fail.

Figure 9:
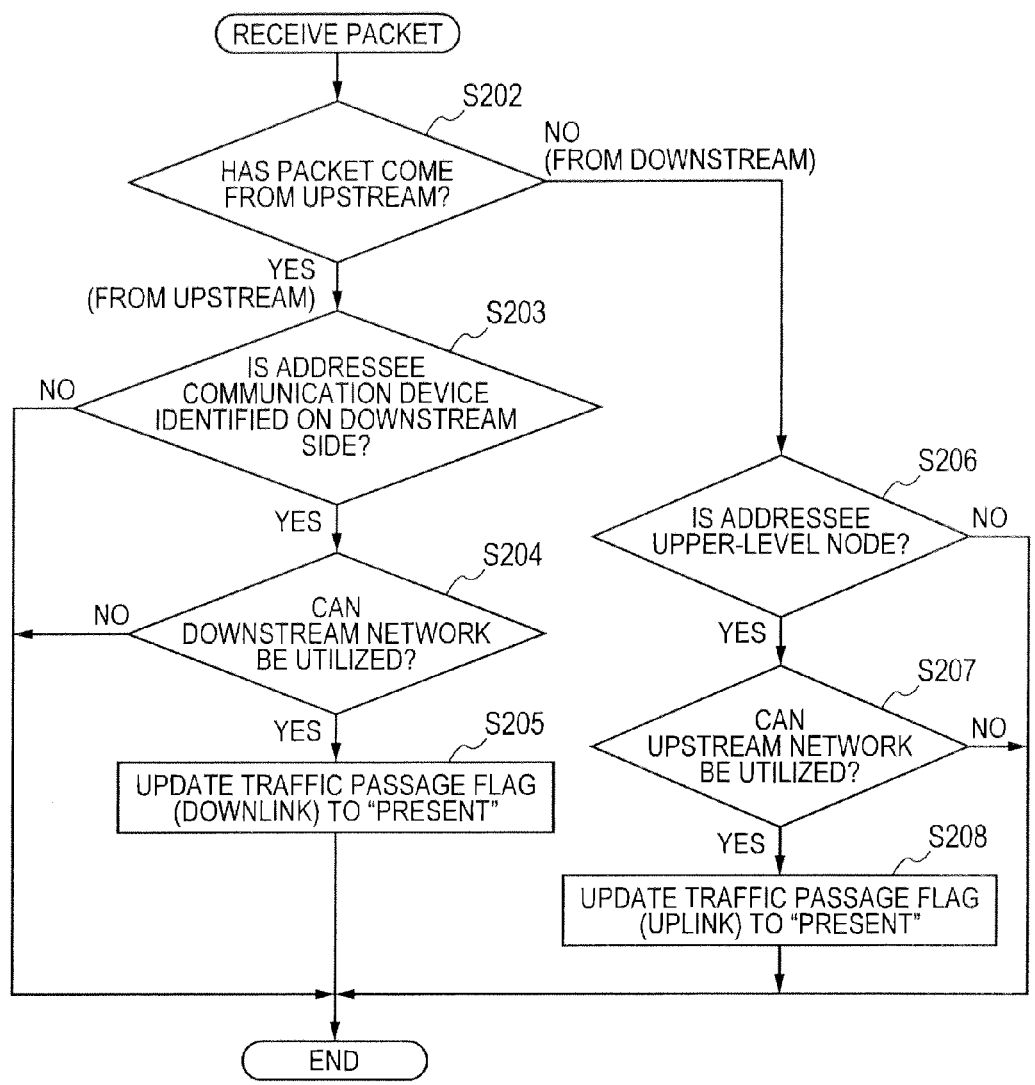
FIG. 9 is a flowchart describing packet transfer processing to be performed by a traffic control unit of the communication device.

Referring to FIG. 9, a flow of traffic monitoring processing in the communication device will be described below. In FIG. 9, the traffic control unit 43 included in the communication device 40 performs processing of monitoring transfer of a packet. On receipt of a packet, the traffic control unit 43 decides whether the received, packet has come from upstream (S202). If the packet has come from upstream (Yes), the traffic control unit 43 decides whether the addressee of the packet is a communication device of an end user on a downstream side (S203). If Yes, the traffic control unit 43 decides whether a communication network oriented to the downstream is in a usable state (S204). If Yes, the traffic control unit 43 updates the traffic passage flag (downlink) 302 to passed traffic Present (S205), and terminates the processing.

If the addressee of the packet that has come from upstream is found at step 203 not to be a lower-level device (No, that is, the packet is addressed to the own communication device or the addressee does not exist), the traffic control unit 43 terminates the processing. If the network on the downstream side is unusable (No, that is, a communication link conformable to the WiFi or 3G is disconnected), the traffic control unit 43 terminates the processing.

Likewise, if the packet is found at step 202 to have come from downstream (No), the traffic control unit 43 decides whether the addressee is an upper-level node (S206). If Yes, the traffic control unit 43 decides whether the communication network to the upper-level node is in a usable state (S207). If Yes, the traffic control unit 43 updates the traffic passage flag (uplink) 301 to passed traffic Present (S208), and terminates the processing.

If the addressee of the packet that has come from downstream is found at step 206 not to be an upper-level side (No, that is, the packet is a control message addressed to the own communication device), the traffic control unit 43 terminates the processing. If the network on the upstream side is found at step 207 to be in an unusable state (No, that is, the Internet, a WiMAX or 3G network is disconnected), the traffic control unit 43 terminates the processing.

Figure 10:
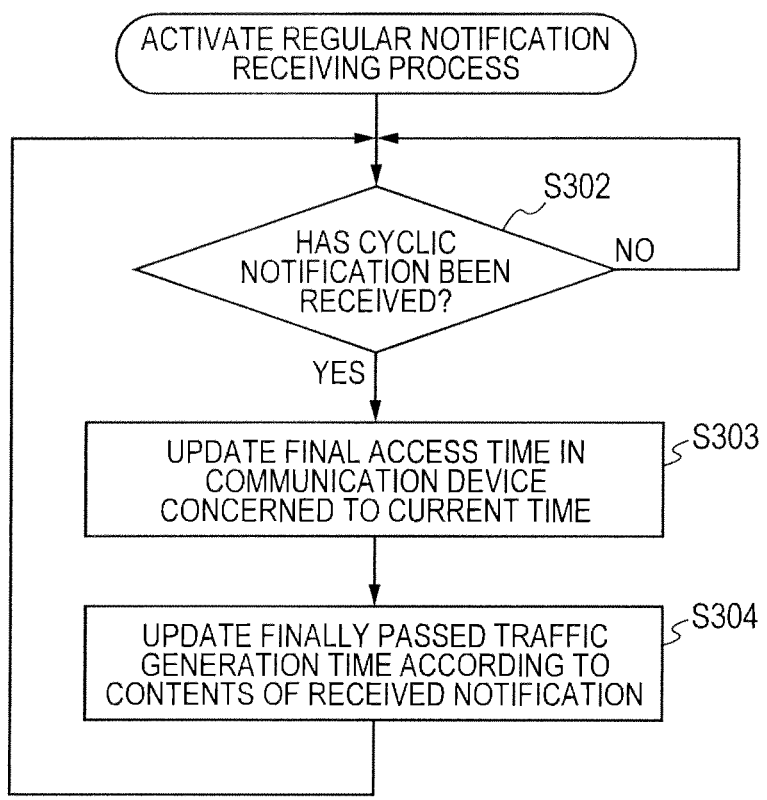
FIG. 10 is a flowchart describing cyclical updating of the server database of the network monitoring device.

Referring to FIG. 10, a flow of updating the network monitoring server database in the network monitoring device will be described below. In FIG. 10, the network monitoring device 20 waits for receiving of a cycle notification from each of the communication device (S302). On receipt of the notification (Yes), the network monitoring device 20 updates the final access time 101 in the communication device concerned with a current time (S303). Further, the network monitoring device 20 updates the finally passed traffic generation time 102 with data received from the communication device (S304), and proceeds to step 302.

Figure 11:
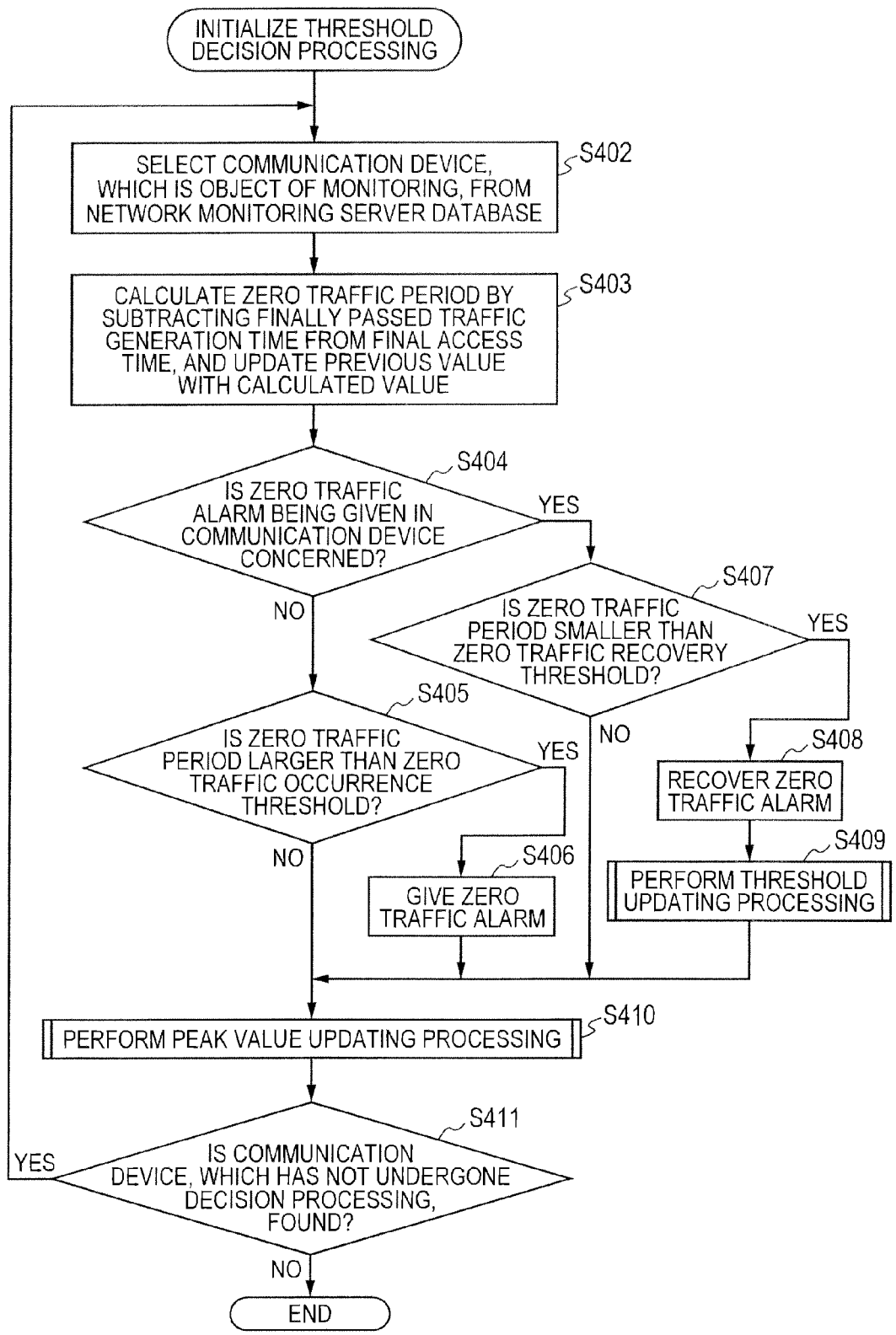
FIG. 11 is a flowchart describing threshold decision processing to be performed by the network monitoring device.

Referring to FIG. 11, a flow of threshold decision processing which the network monitoring device cyclically performs will be described below. In FIG. 11, the network monitoring device 20 performs threshold decision processing at intervals of the cycle specified fn the decision cycle 255. During the threshold decision processing, the network monitoring device 20 performs detection of a zero traffic state and processing of updating various kinds of data items that are necessary for the processing. When the threshold decision processing is activated, the network monitoring device 20 selects one communication device, which is an object of processing, from the network monitoring server database (S402), The network monitoring device 20 calculates the value of the zero traffic period 202 in the communication device according to a formula below, and updates the previous value with the calculated value (S403).

$$\text{Zero traffic period 202} = \text{final access time 101} - \text{finally passed traffic generation time 102} \quad (2)$$

The zero traffic period refers to a difference between a time at which communication between the communication device and network monitoring device is made and a terminal time of a cycle at which user traffic is finally passed to the communication device. Therefore, during a period in which the communication between the communication device and network monitoring device is not made, the final access time is not updated (is held at the time at which the communication is finally made). As a result, a period to be calculated as the zero traffic period is not Increased. Accordingly, a state in which the communication device is not started and a state in which a zero traffic has occurred, can be detected while being discriminated from each other.

Thereafter, the network monitoring device 20 decides whether a zero traffic alarm is given in the communication device (S404). If the alarm is not given (No), the network monitoring device 20 decides whether the calculated value of the zero traffic period is larger than the aero traffic occurrence threshold 201 set in the communication device (S405). If the calculated value is larger (Yes), the network monitoring device 20 performs processing of newly giving the zero traffic alarm in the communication device (S406).

If the alarm is found at step 404 to have already seen given (Yes), the network monitoring device 20 decides whether the calculated value of the zero traffic period is smaller than the zero traffic recovery threshold 251 (S407). If the calculated value is smaller (Yes), the network monitoring device 20 performs restoration processing on the zero traffic alarm in the communication device (S408). The network monitoring device 20 then performs threshold updating processing (S409). The threshold updating processing will be detailed in conjunction with FIG. 13.

If No is selected at step 405 or step 407, the network monitoring device 20 does not perform any processing on the alarm state or threshold.

Thereafter, the network monitoring device 20 performs updating processing on the value of the zero traffic period (peak value) 203 (S410). The peak value updating processing will be described later in conjunction with FIG. 12. The zero traffic period (peak value) is data to be used to manage a maximum zero traffic period that is previously observed In each of the communication devices. By including a logic circuit that calculates the zero traffic occurrence threshold 201 for each of the communication devices on the basis of the zero traffic period (peak value), the zero traffic occurrence threshold can be automatically updated in consideration of a difference in the usage or installation environment of each of the communication devices from the others. Threshold updating processing will be described later in conjunction with FIG. 13.

After threshold decision processing concerning one communication device Is completed as mentioned above, the network monitoring device 20 decides whether any communication device that has not undergone threshold decision is found (S411), If Yes, the network monitoring device 20 proceeds to step 402. If No is selected at step 411, the network monitoring device 20 terminates the processing and stands by until the next threshold decision time comes.

Figure 12:
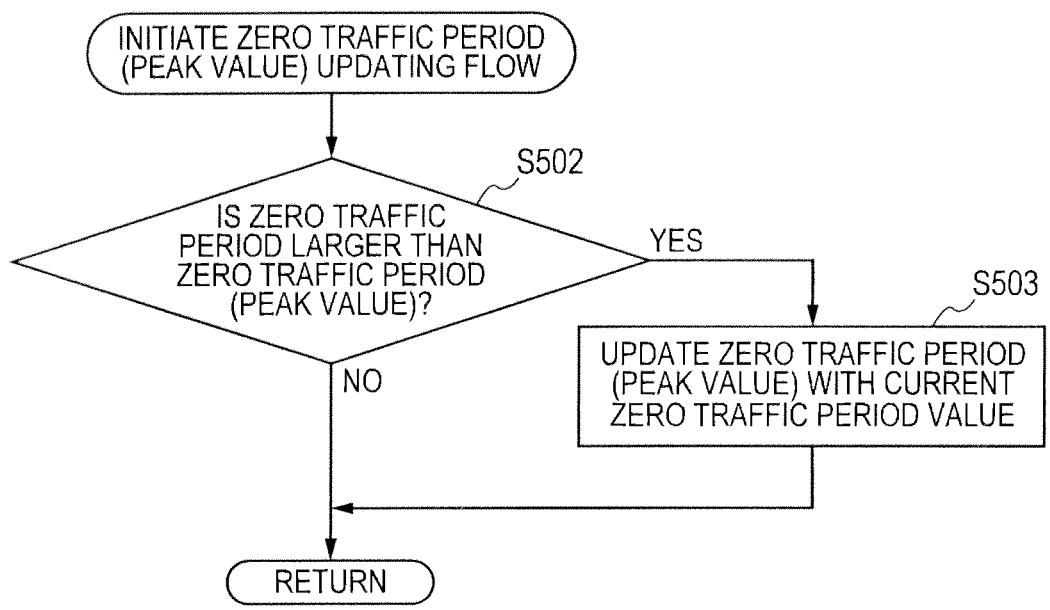
FIG. 12 is a flowchart describing updating of a zero traffic period (peak value) in a zero traffic history management table in the network monitoring device.

Referring to FIG. 12, a flow of updating the zero traffic period (peak value) will be described below. The flow in FIG. 12 is processing to be invoked at step 410 in FIG. 11. FIG. 12 describes processing that is performed without fail during threshold decision processing to be cyclically performed on every communication device.

In FIG. 12, when invoked, the network monitoring device 20 decides whether the value of the zero traffic period 202 is larger than the zero traffic period (peak value) 203 (S502). If the value is larger (Yes), the network monitoring device 20 updates the zero traffic period (peak value) with the current value of the zero traffic period (S503), and returns to threshold decision processing. If No Is selected at step 502, the network monitoring device 20 returns to the threshold decision processing.

Figure 13:
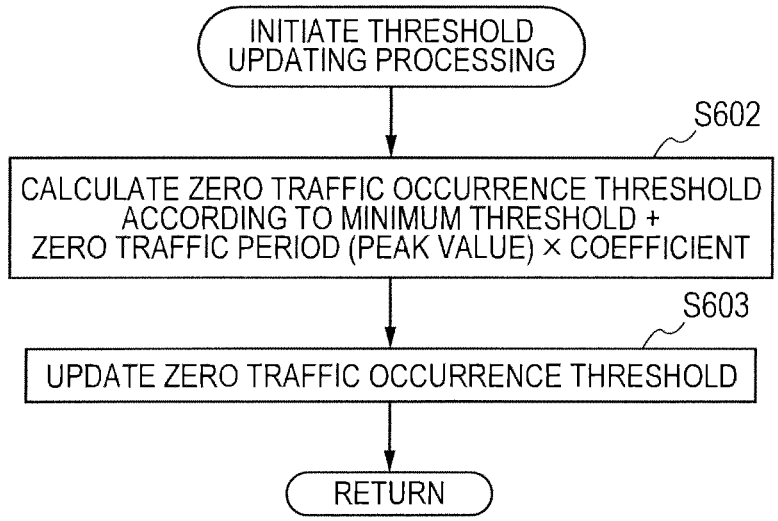
FIG. 13 is a flowchart describing updating of a zero traffic decision threshold (occurrence) in the zero traffic history management table in the network monitoring device.

Referring to FIG, 13, a threshold updating processing flow will be described below. The flow in FIG. 13 is processing to be invoked at step 409 in FIG. 11, that is, processing to be performed when traffic is generated in the communication device in which a zero traffic alarm is given and the zero traffic alarm is restored. The threshold updating processing is processing to be performed in order not to give an alarm during a zero traffic period. Specifically, assuming that although an alarm is given because a threshold is exceeded, traffic is restored after the elapse of an alarm giving period, the zero traffic period in the communication device concerned is regarded as a period that may be observed in a certain use environment, and the alarm is therefore not given during the similar zero traffic period. For the communication device, the network monitoring device 20 calculates the zero traffic occurrence threshold 201 according to a formula below (S602).

Zero traffic occurrence threshold 201=minimum threshold 252+zero traffic period (peak value) 203×coefficient 253 The network monitoring device 20 updates the zero traffic occurrence threshold 201, which is used for threshold decision processing (FIG. 11) to be performed next time or thereafter in the communication device, with the calculated value (S603), and terminates the processing.

According to the first embodiment, in a communication system accommodating a large number of small-capacity and low-availability devices, a use suspended state derived from power discontinuity of a device itself can be discriminated from a zero traffic state that is a faulty state. Further, it is difficult to apply a uniform fault detection threshold to all the small-capacity devices, though the application is requested for the small-capacity devices. The difficulty attributable to a large difference in an installation place or use environment can be overcome by providing a unit that allows a system to autonomously learn a threshold for each communication device.

According to the first embodiment, an alarm against a zero traffic state can be provided as useful fault information on a fault, which should be resolved, for a maintenance person. In addition, sensing a zero traffic in a device which is stopped for reasons known only to a communication equipment installer can be ceased. Therefore, the zero traffic can be sensed in a system which accommodates CPE, an onboard radio repeater, and others and in which the power supply of a communication device may be turned off irrespective of the intention of a network administrator.

Second Embodiment

In the first embodiment, the zero traffic period (peak value) 203 to be employed in calculation of the zero traffic occurrence threshold 201 is regarded as a value of a maximum period which is previously observed in a communication device concerned and traffic is restored (generated), and only the one value is managed.

In a second embodiment, plural zero traffic periods (peak values) 203 are summated, and a mean value is used to calculate the zero traffic occurrence threshold.

In the second embodiment, in a system having the system configuration shown in FIG. 1, network monitoring device hardware shown in FIG. 2, network monitoring device shown in FIG. 3, communication devices each shown in FIG. 4, network monitoring server database shown in FIG. 5, parameter table shown in FIG. 6B, and traffic management table shown in FIG. 7, the zero traffic management table has the structure shown In FIG. 14 instead of the structure shown in FIG. 6A. Processing to be performed by the communication device 40 (FIG. 8 to FIG. 10) is identical to that in the first embodiment. The processing described in FIG. 10 and FIG. 11 as processing to be performed by the network monitoring device is shared with the first embodiment.

Referring to FIG. 14, another zero traffic history management table of a network monitoring server will be described below. In FIG. 14, a zero traffic management table 200A preserves, similarly to that in FIG. 6A, previous occurrences of a zero traffic in association with each of communication devices that sue objects of monitoring. The zero traffic management table 200A includes a zero traffic occurrence threshold 201, a zero traffic period 202, and zero traffic periods (peak values) 203-1 to 203-n in association with each of the communication devices.

The zero traffic occurrence threshold 201 is a field in which a value of a threshold for use in giving an alarm if a zero traffic state continues in a communication device concerned for a period equal to or larger than the value is stored. The zero traffic period 202 specifies a zero traffic period which the network monitoring device recognizes as currently being observed in the communication device concerned. The zero traffic period (peak value) 203 specifies a peak value (maximum value) of the zero traffic period that is previously observed in the communication device.

Figure 16:
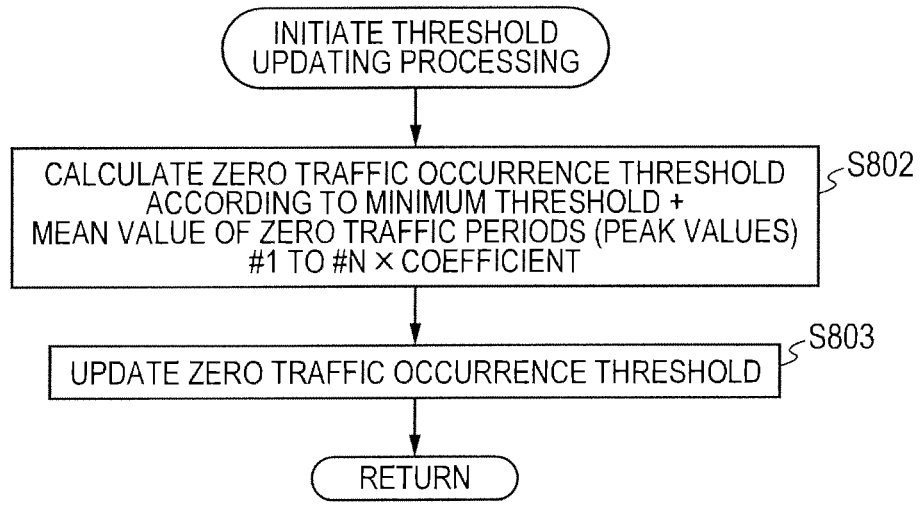
FIG. 16 is a flowchart describing other updating of the zero traffic decision threshold (occurrence) In the zero traffic history management table.

A zero traffic occurrence threshold 201 specifies data similar to that in FIG. 6A. However, as a method of calculating the zero traffic occurrence threshold 201, a method mentioned in FIG. 16 is adopted. A zero traffic period 202 specifies data similar to that in FIG. 6A, and a calculation method is identical to that mentioned previously.

Figure 15:
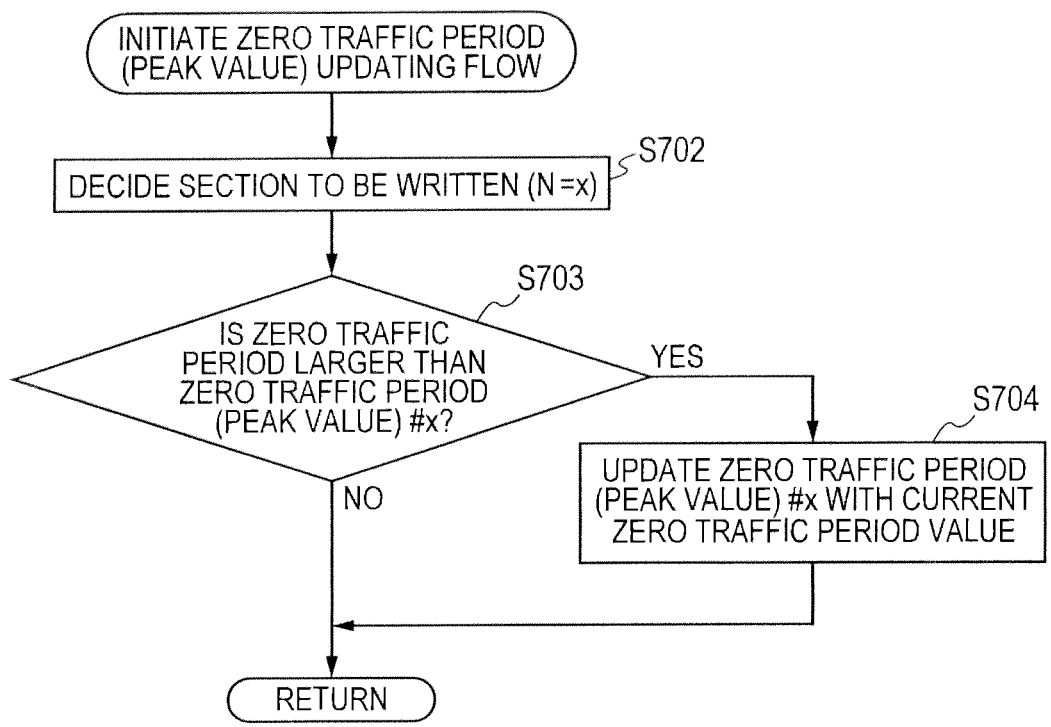
FIG. 15 is a flowchart describing another updating of the zero traffic period (peak value) in the zero traffic history management table.

The zero traffic periods (peak values) 203-1 to 203-n each signify the same value as the zero traffic period (peak value) 203 in FIG. 6A does. The second embodiment is characterized by a point that data item of plural periods are managed. In FIG. 15 that describes peak value updating processing, a section of a zero traffic period (peak value) to be written is changed from one to another according to an activity period, or more particularly, a date, a day, or a month. When the section to be written is changed, processing of clearing old data is carried out. Accordingly, continuous use of an old zero traffic period (peak value) can be avoided.

Referring to FIG. 15, another flow of updating a zero traffic period (peak value) will be described below. The flow in FIG. 15 is activated by peak value updating processing (S410) included in threshold decision processing (FIG. 11) that is cyclically activated by the network monitoring device 20. The network monitoring device 20 decides a domain N (N denotes 1, 2, etc., or n) of zero traffic periods (peak values) that should be written at that time (S702). A method of daily changing a section to be written from one to another or a method of monthly changing the section to be written from one to another is conceivable. The number (n) of zero traffic periods (peak values) to be obtained as the domain can be set to any value according to the method of changing the section to be written. For a method of changing sections on a specific date, the number of zero traffic periods (peak values) may be set to a value for seven days so that the sections can be weekly changed on the sane day, or may be set to a value for fourteen days so that fortnight's data can be preserved. For the monthly changing method, the number of zero traffic periods (peak values) may be set to a value for forty months or twenty-four months.

Thereafter, the network monitoring device 20 checks the value of the zero traffic period 253 to see whether the value is larger than the value of the zero traffic period (peak value) #x specified in a current field to be written among the fields of the zero traffic periods (peak values) 203-1 to 203-n (S703). If the value is larger (Yes), the network monitoring device 20 updates the zero traffic period (peak value) #x with the value of the current zero traffic period (S704). If No is selected at step 703 or after step 704 is completed, the network monitoring device 20 returns to threshold decision processing, Referring to FIG. 10, another flow of threshold updating processing will be described below. FIG. 16 describes processing to be invoked at step 409 in FIG. 11 similarly to that of the first embodiment. In FIG. 16, the network monitoring device 20 calculates a zero traffic occurrence threshold according to a formula (3) below (S802).

Zero traffic occurrence threshold=minimum threshold+mean value of zero traffic periods (peak values) #1 to #N×coefficient  (3)

The network monitoring device 20 updates the zero traffic occurrence threshold 252, which is employed in threshold decision processing (FIG. 11) to be performed next time and thereafter in the communication device concerned, with the calculated value (S803), and then returns to the threshold decision processing.

According to the second embodiment, in a communication system, accommodating a large number of small-capacity and low-availability devices, a use suspended state derived from power discontinuity of a device itself can be discriminated from a zero traffic state that is a faulty state. Further, it is difficult to apply a uniform fault detection threshold to all the small-capacity devices, though the application is requested for the small-capacity devices. The difficulty attributable to a large difference in an installation place or use environment can be overcome by providing a unit that allows a system to autonomously learn a threshold for each of communication devices by referencing zero traffic periods (peak values) within a certain specific previous time range. Accordingly, an alarm against a zero traffic state can be provided as useful fault information on a fault, which should be resolved, for a maintenance person.

In the present embodiment, since an old zero traffic period (peak value) is not referenced after the elapse of a certain period, a mean value of maximum zero traffic periods within a certain previous time range is used to calculate a threshold but all previous maximum zero traffic periods are not used as a basis.

If a long zero traffic period (peak value) is observed, the zero traffic occurrence threshold 201 assumes a large value thereafter in the first embodiment. In the second embodiment, although the long zero traffic period (peak value) is referenced in order to calculate the zero traffic occurrence threshold 252 for a certain period of time, the long zero traffic period (peak value) is discarded thereafter. This would prove useful in a case where employment of a zero traffic period (peak value), which represents an incidental long-term zero traffic, in calculation of the threshold should be avoided to the greatest possible extent for using the zero traffic occurrence threshold 252 for the shortest possible period.

According to the second embodiment, a condition inherent to an installation place such as a day-to-day fluctuation of traffic or a long no-business period in an office in which communication equipment is installed can be learned. Accordingly, a zero traffic can be sensed under a condition taking account of a zero traffic period that varies depending on a usage inherent to the installation place. Eventually, a device in which a fault has occurred can be sensed with higher precision.

What is claimed is:

1. A network monitoring device connected to communication device over a network, comprising:
   a recording unit which records a first time, wherein the first time is a time at which the monitoring device receives a periodically transmitted notification from the communication device;
   a receiving unit that periodically receives the notification, which contains a second time, from the communication device, wherein the second time is the most recent time when the communication device last receives or transmits traffic, and wherein the receiving unit records the second time;
   and an arithmetic unit that subtracts the second time from the first time, compares a result of the subtraction with a first threshold for the communication device, and gives an alarm when the result of the subtraction exceeds the first threshold.

2. The network monitoring device according to claim 1, wherein for the communication device in which the alarm is being given, the arithmetic unit subtracts the second time from the first time, compares the result of the subtraction with a second threshold for the communication device, and suspends the alarm when the result of the subtraction falls below the second threshold.

3. The network monitoring device according to claim 2, wherein the arithmetic unit preserves a maximum, value of the result of the subtraction; and
   for the communication device in which the alarm is suspended, the arithmetic unit corrects the first threshold on the basis of the maximum value.

4. The network monitoring device according to claim 3, wherein the arithmetic unit preserves a plurality of recording sections of the maximum values according to an activity period of the communication device;
   when the recording sections are changed, the arithmetic unit tentatively clears recorded maximum values; and
   for the communication device in which the alarm is suspended, the arithmetic unit corrects the first threshold on the basis of a mean value of the plurality of maximum values.

* * * * *